Dec. 5, 1950     J. A. SCHAEFFER     2,532,789
MANUFACTURE OF CARBON BLACK
Filed May 31, 1946
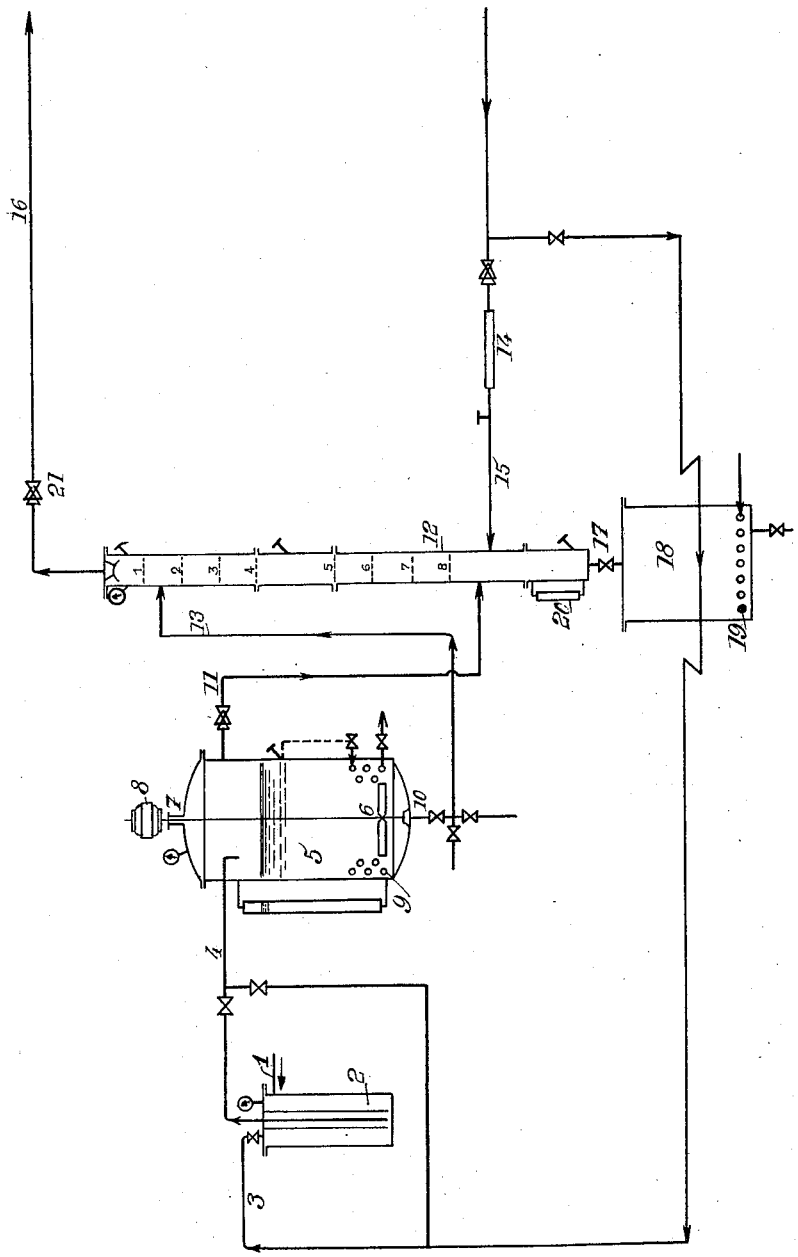
INVENTOR
*Jean Adolphe Schaeffer*
BY
*Blair, Curtie & Hayward*
ATTORNEYS Patented Dec. 5, 1950

2,532,789

UNITED STATES PATENT OFFICE 2,532,789

MANUFACTURE OF CARBON BLACK

Jean Adolphe Schaeffer, Colombes, France, assignor to Compagnie Francaise de Raffinage (Societe Anonyme), Paris, France, a French corporation Application May 31, 1946, Serial No. 673,448
In France June 7, 1945

3 Claims. (Cl. 23—209.6)

The present invention has for its object a method and means for enriching natural gas, preferably after degasolination, with anthracenic products chiefly with a view to producing carbon black. But the invention is applicable as well with methane or producer gas or coke oven gas or even with natural gas which has been previously submitted to cracking, after the products obtained through cracking have been separated if required.

The expression anthracenic products is intended to cover both the anthracenic oils, themselves and the pasty or the like residual material obtained after the anthracene has been removed from the anthracenic oil.

Obviously, it is possible to use in lieu of the anthracenic products any other heavy aromatic compound or else waste from petroleum treating and the like industries. It is also possible to use the arrangement for loading gases with naphthalene although most of the steps used according to the invention are superfluous in this case by reason of the very easy complete vaporisation possibilities of the naphthalene.

Now it has been found according to the invention that it is essential to filter the pasty or the like anthracenic product in order to remove therefrom the solid suspension constituted principally by fine carbon particles. This filtering is executed, preferably under gas pressure at a temperature of the order of 100° C. or more, with diaphragm filters or else with filter plugs constituted by paper washers, which avoids the use of filtering auxiliaries.

The main feature of the invention consists in vaporizing and flashing anthracenic paste without it being necessary to directly heat it.

To this end, the filter paste passes inside a preheater inside which it is merely brought to a temperature of the order of 180° C. The molten paste is then brought into a vaporiser inside which it is partly evaporated under the combined action of the partial pressure of the gas, and of the heat evolved by the gas itself which has been preheated to this purpose to a temperature of 350 to 400° C., the gas being caused to pass therefor through a preheater unless it is fed by a cracking plant.

The gaseous current produces inside the vaporiser a high partial pressure. The vaporiser which also forms one of the objects of the invention is characterized through the fact that it operates after the manner of a column but with a reduced volume of liquid, which avoids the difficulties of reheating during vaporisation. This column is provided with plates similar to sieves or perforated plates. These plates are preferably provided with overflow chutes for the removal of the molten paste.

The product obtained by the instantaneous flashing between the upper and lower sections of the vaporiser and which is constituted by the vaporisable part of the paste and by a certain proportion of the nonvaporized product which is carried along, rises and passes into the upper part of the vaporiser. The upper plate acts as powerful extracting means which strip the vapors from all liquid particles which might have a tendency to easily deposit subsequently along their path.

The nonvaporisable parts of the paste pass through the lower plates of the vaporiser where they are submitted to an energetic stripping by the hot gas entering the vaporiser.

The liquid particles which have been finally rejected are collected inside a reservoir arranged underneath the vaporiser proper. A worm providing for the heating through the exhaust steam is located inside this reservoir for holding the pasty residuum in a sufficiently fluid state for allowing its periodic removal.

As its outlet from the vaporiser, the gases loaded with anthracene are submitted to a partial expansion which contributes in stabilizing the mixture.

The example given out hereinafter which should of course not be construed as a limitation on the invention shows how the latter may be executed in practice while it allows its new and advantageous features to appear more clearly. This particularly interesting form of execution is illustrated diagrammatically in accompanying drawings.

The anthracenic paste is admitted at a temperature of 100° C. through the pipe 1 into the filter 2 of the plug filter type, the plugs being constituted in this case for instance by paper washers. This filter operates under a difference in pressure of 49.7 pounds per square inch, the necessary pressure being obtained through the gases arriving under a pressure of 63.9 pounds per square inch through the line 3 while an operating pressure of 14.2 pounds per square inch is kept up on the filtering side.

The paste is removed in a continuous manner through the pipe 4 and enters a preheater 5. Said preheater, preferably in the shape of a vertical cylinder, provides for heating the paste from 100 to 180° C. by heating same with high pressure steam.

According to two further features of the invention, said apparatus works under an operating pressure adjusted in the case of the present example to an effective pressure of 14.2 pounds per square inch and it includes a mechanical stirrer. The pressure kept up in the preheater has for its object to make the adjustment of the output easier by making said output independent of the variations in level. The pressure is obtained through natural gas as the vapour pressure of the liquid at 180° C. would not be sufficient.

In the drawing the mechanical stirrer has been illustrated at 6. It passes through the stuffing box 7 and is driven by the motor 8. This preheater is heated by a heating worm 9 and includes a discharge pipe 10 for conducting the anthracenic paste in fluid form from the body of preheater 5 to the pipe 13. Above the liquid level therein there opens into the preheater an exhaust pipe 11 provided with a pressure regulator. This pipe 11 leads to the vaporiser; it is thus apparent that the preheater may be fed with filtered paste without interrupting the operation of the vaporiser.

The anthracenic paste which is led through the pipe 13 to the vaporiser 12 sinks inside the latter. The vaporiser 12 is constituted for instance by a column comprising say 8 sieve plates. These sieve plates are illustrated diagrammatically on the figure as constituted by canvas of 10 to 30 mesh suitably carried by a metallic disc. When mounting the vaporiser the sieve may be held between the flanges of the successive sections of the column or else be directly spot-welded inside the column.

The gas, eventually superheated at 350° C. inside the superheater 14, enters the base of the vaporiser through the pipe 15 under an effective pressure of about 4.3 pounds per square inch. These gases laden with anthracenic products escape through the pipe 16 at the upper end of the column. An expansion member 21 reduces the pressure from 4.3 pounds per square inch to about 0.07 pound per square inch so as to stabilize the mixture. The gas thus enriched is led under this latter pressure towards the burners which have not been illustrated. It is thus possible to obtain according to the nature of the anthracenic products used an enrichment of the magnitude of 400 or 600 grammes or even more.

Under the above described conditions, and with an anthracenic paste it is possible to obtain a flash of about 50% while the nonvaporisable residuum may be extracted from the column 12 in a continuous or periodical manner through the pipe 17 in order to be collected in the reservoir 18 inside which it is held in a sufficiently fluid state by means of a worm 19 heated by the exhaust steam. The level 20 allows adjusting the output of this exhausted residuum.

What I claim is:

1. In a process for producing carbon black from combustible gas enriched with anthracenic and the like heavy aromatic products, the step of enriching the combustible gas which comprises preheating said anthracenic products to a temperature of about 180° C. to liquefy said products, intimately contacting said liquid products with a current of said combustible gas maintained at a temperature of the order of 350° C. to 400° C. and at a pressure of at least about 4 pounds per square inch, and causing said gas after contact with said liquid product to expand to a pressure slightly above atmospheric, thereby stabilizing the enriched gas and leading the thus enriched gas under the latter pressure to the burners for producing the carbon black.

2. In a process for producing carbon black from combustible gas enriched with anthracenic and the like heavy aromatic products, the step of enriching the gas which comprises filtering said anthracenic products to remove carbonaceous solids, preheating said anthracenic products to a temperature of about 180° C., intimately contacting said anthracenic products with a current of said combustible gas maintained at a temperature of about 350° C. to 400° C. and at a pressure of at least about 4 pounds per square inch, and thereafter causing the thereby-enriched gas to expand to a pressure slightly above atmospheric in order to stabilize the mixture and leading the thus enriched gas under the latter pressure to the burners for producing the carbon black.

3. The process according to claim 2 wherein the anthracenic products are agitated while being preheated to minimize localized overheating.

JEAN ADOLPHE SCHAEFFER.

REFERENCES CITED

The following references are of record in the file of this patent:

UNITED STATES PATENTS

| Number | Name | Date |
|---|---|---|
| 2,007,656 | Meigs | July 9, 1935 |
| 2,161,964 | La Brecque | June 13, 1939 |
| 2,225,354 | Schmalenback | Dec. 17, 1940 |
| 2,307,050 | Kloepfer | Jan. 5, 1943 |

FOREIGN PATENTS

| Number | Country | Date |
|---|---|---|
| 500,467 | Great Britain | Feb. 9, 1939 |